US010568182B2

(12) United States Patent
Meerbeek et al.

(10) Patent No.: US 10,568,182 B2
(45) Date of Patent: Feb. 18, 2020

(54) LIGHTING CONTROL BASED ON ORIENTATION AND AUXILIARY DEVICE INPUT

(71) Applicant: SIGNIFY HOLDING B.V., Eindhoven (NL)

(72) Inventors: Berent Willem Meerbeek, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 18 days.

(21) Appl. No.: 15/575,941

(22) PCT Filed: May 17, 2016

(86) PCT No.: PCT/EP2016/061010
§ 371 (c)(1),
(2) Date: Nov. 21, 2017

(87) PCT Pub. No.: WO2016/188799
PCT Pub. Date: Dec. 1, 2016

(65) Prior Publication Data
US 2018/0153023 A1    May 31, 2018

(30) Foreign Application Priority Data

May 22, 2015    (EP) ..................................... 15168949

(51) Int. Cl.
*H05B 37/02*    (2006.01)
*H04R 1/02*    (2006.01)
*H04R 3/00*    (2006.01)

(52) U.S. Cl.
CPC ......... *H05B 37/0227* (2013.01); *H04R 1/028* (2013.01); *H04R 3/00* (2013.01);
(Continued)

(58) Field of Classification Search
None
See application file for complete search history.

(56) References Cited

U.S. PATENT DOCUMENTS 9,539,942 B2 * 1/2017 Salter ................. H05B 37/0227
10,129,954 B2 * 11/2018 Despres .............. F21V 23/0471
(Continued)

FOREIGN PATENT DOCUMENTS

| WO | 2006038135 A1 | 4/2006 |
| WO | 2009126279 A1 | 10/2009 |
| WO | 2014001956 A2 | 1/2014 |

OTHER PUBLICATIONS

Jong-Jin Jung et al., "An Intuitive User Interaction Method Using Multi-Sensors for Pencil Drawing Filter of NPR Rendering in Mobile Devices," Springer, Multimed Tools Appl (2015) 19 Pages.

*Primary Examiner* — Cassandra F Cox
(74) *Attorney, Agent, or Firm* — Meenakshy Chakravorty

(57) ABSTRACT

A lighting device for notification and/or atmosphere creation is disclosed. The lighting device (100) comprises at least one light source (102) arranged for rendering a light output. The lighting device (100) further comprises a detector (104) arranged for detecting a first orientation of the lighting device (100) and a receiver (106) for receiving a first signal from a first device (110). The lighting device (100) also comprises a processor (108) arranged for generating a first light setting based on the first signal and the first orientation of the lighting device (100), and for controlling the light output of the at least one light source (102) based on the first light setting in order to apply the generated light setting, wherein the detector (104) is further arranged for detecting a user input indicative of a reorientation of the lighting device (100), and for detecting a second orientation based on the reorientation, and wherein the processor (108) is further arranged for generating a second light setting, based on the
(Continued)

first signal and the second orientation of the lighting device (100), and for controlling the light output of the at least one light source (102) based on the second light setting, wherein the light output in the first orientation is different from the light output in the second orientation. This allows a user to change the orientation of the lighting device (100) (e.g. by rotating the lighting device (100)) in order to further control the light setting of the lighting device (100). This further allows the user to control the light notification setting of the lighting device (100) or the atmosphere created by the lighting device (100), while the light setting remains in accordance with the setting of the first device (110).

15 Claims, 5 Drawing Sheets

(52) U.S. Cl.
CPC ....... *H05B 37/029* (2013.01); *H05B 37/0272* (2013.01); *H05B 37/0281* (2013.01)

(56) References Cited

U.S. PATENT DOCUMENTS

| | | |
|---|---|---|
| 2001/0028227 A1 | 10/2001 | Lys et al. |
| 2002/0195953 A1 | 12/2002 | Belliveau |
| 2009/0122571 A1 | 5/2009 | Simmons et al. |
| 2014/0268700 A1 | 9/2014 | Mumma et al. |
| 2016/0150624 A1* | 5/2016 | Meerbeek .......... H05B 33/0863 315/297 |
| 2017/0023945 A1* | 1/2017 | Cavalcanti ........... G08G 1/0116 |

* cited by examiner

LIGHTING CONTROL BASED ON ORIENTATION AND AUXILIARY DEVICE INPUT

CROSS-REFERENCE TO PRIOR APPLICATIONS

This application is the U.S. National Phase application under 35 U.S.C. § 371 of International Application No. PCT/EP2016/061010, filed on May 17, 2016, which claims the benefit of European Patent Application No. 15168949.4, filed on May 22, 2015. These applications are hereby incorporated by reference herein.

FIELD OF THE INVENTION

The invention relates to a lighting device and a lighting system for notification and/or atmosphere creation by generating a light setting. The invention also relates to a method of controlling a lighting device for notification and/or atmosphere creation by generating a light setting. The invention further relates to a computer program product for performing the method.

BACKGROUND

Future and current home and professional environments will contain a large number of lighting devices for creation of ambient, atmosphere, accent or task lighting. These controllable lighting devices may be controlled via a (wireless) network or via physical interaction with the controllable lighting device. An example of a lighting device that may be controlled via physical interaction is disclosed in patent application WO2006038135A1, wherein the light emission of a portable lighting device is based on the orientation of the lighting device. The increase of (portable) smart lighting devices in home and professional environments and the emergence of the internet of things provide new interaction paradigms for lighting control.

Patent application US 20090122571 A1 discloses a smart light controller for transmitting light command signals to a smart light, which comprises a processing device configured to receive RF command signals and generate corresponding information indicator control signals that are transferred to an information indicator configured to display information. The processing device may be associated with an orientation sensor to determine when the smart light is oriented in a particular direction. For example, the processing device uses the orientation sensor to determine if a first side or a second side is the top side. If processing device determines that the first side is the top side, and processing device receives a left turn signal, the LEDs of the smart light are controlled to indicate a left arrow. Alternatively, if processing device determines that the second side is the top side, and processing device receives the left turn signal, the LEDs of the smart light are controlled to indicate a left arrow. As such, the light output in the first orientation and the second orientation is the same.

SUMMARY OF THE INVENTION

It is an object of the present invention to provide new interaction paradigms for notification and atmosphere creation via physical interaction with a lighting device.

According to a first aspect of the present invention the object is achieved by a lighting device for notification and/or atmosphere, the lighting device comprising:

at least one light source arranged for rendering a light output, a detector arranged for detecting a first orientation of the lighting device, a receiver arranged for receiving a first signal from a first device, and a processor arranged for generating a first light setting based on the first signal and the first orientation of the lighting device, and for controlling the light output of the at least one light source based on the first light setting, wherein the detector is further arranged for detecting a user input indicative of a reorientation of the lighting device, and for detecting a second orientation based on the reorientation, and wherein the processor is further arranged for generating a second light setting, based on the first signal and the second orientation of the lighting device, and for controlling the light output of the at least one light source based on the second light setting, wherein the light output in the first orientation is different from the light output in the second orientation.

The processor determines the light setting of the lighting device based on the orientation detected by the detector (e.g. by a gyroscope, an accelerometer, a magnetometer, etc.) and the first signal received from the first device. This allows the processor to generate the light setting such that it is in accordance with, for example, a mode of operation (e.g. a setting) of the first device. Therefore, the lighting device may provide light notifications based on the first signal received from the first device, or the lighting device may create an atmosphere in accordance with the mode of operation of the first device. The user may change the orientation of the lighting device (e.g. by rotating the lighting device) in order to further control the light setting of the lighting device. This is advantageous because it allows a user to further adjust the light notification setting of the lighting device (for example to change the information provided by the lighting device) or to adjust the atmosphere created by the lighting device, while the light setting remains in accordance with the setting of the first device. Another benefit of this lighting device is that a user may interact with it in a playful and intuitive way in order to adjust the light setting, while the light setting remains in accordance with the setting of the first device.

In an embodiment of the lighting device, the processor is further arranged for generating a plurality of light settings based on the received first signal, and for associating the plurality of light settings with a plurality of orientations of the lighting device, and for controlling the light output of the at least one light source based on the light setting associated with a current orientation of the lighting device. In this embodiment, the processor generates a light setting for different orientations of the lighting device, thereby creating predefined associations between the light output and the lighting device's orientation. The processor may store these predefined associations in a memory, which may be advantageous because the processor can access the associations immediately based on the orientation, thereby removing the need for determining the light setting based on the first signal each time the orientation changes. This may further result in an improved user experience, because it allows a user to switch more quickly between light settings by adjusting the orientation of the lighting device.

In a further embodiment of the lighting device, the processor is arranged for determining a plurality of light settings based on a plurality of received first signals, and for associating the plurality of light settings with a plurality of orientations of the lighting device. In this embodiment, the processor generates multiple light settings for multiple orientations of the lighting device based on multiple signals received from the first device, thereby creating predefined associations between the light output and the lighting device's orientation. The processor may store these predefined associations in a memory, which may be advantageous because the processor can access the associations immediately based on the orientation, thereby removing the need for determining the light setting based on the first signal each time the orientation changes. This embodiment may be further advantageous, because it may further allow the first device to determine how the light settings should be associated with the orientations of the lighting device.

In an embodiment of the lighting device, the lighting device comprises a plurality of surface areas, wherein each surface area corresponds to an orientation of the lighting device. The processor is arranged for associating a plurality of light settings with the plurality of surface areas, and for controlling the light output of each surface area according to its associated light setting. The light setting may be applied to only one surface area (e.g. only to the upward facing surface area) or multiple light settings may be applied to the plurality of light settings, each to its own surface area. The latter is advantageous because a user can see the possible light settings of the lighting device. This allows the user to select a specific light setting based on the information provided via the surface areas.

In an embodiment of the lighting device, the processor is arranged for generating a dynamic light setting based on the first signal and a current orientation of the lighting device, the dynamic light setting being defined by a sequence of light settings distributed over a plurality of points in time. Generating a dynamic light setting may be advantageous for atmosphere creation. Furthermore, generating a dynamic light setting may be advantageous for notification if, for example, a time-related light setting is to be visualized via the light output of the lighting device.

In an embodiment of the lighting device, the lighting device further comprises an audio rendering element arranged for generating an audio effect, and the processor is further arranged for controlling the audio rendering element based on the current orientation of the lighting device and the first signal, thereby generating the audio effect which is dependent on a current orientation and the first signal. This embodiment is advantageous because audio may have an added value for atmosphere creation and/or user notification.

In an embodiment of the lighting device, the processor is further arranged for controlling the light output of the at least one light source further based on time and/or date information. Adjusting the light output based on the time and/or day may have a positive influence on the atmosphere created by the lighting device. Furthermore, adjusting the light output based on the time and/or day may be beneficial for notification lighting created by the lighting device.

In an embodiment of the lighting device, the processor is arranged for controlling the light output of the at least one light source such that the light emitted by the at least one light source comprises an embedded code. The embedded code may be detected by a further device, such as the first device, which allows the further device to recognize/identify the lighting device. This may be advantageous because it may allow the first device to transmit the first signal to the lighting device, thereby providing the lighting device with the required information for setting the light output relative to the (plurality of) orientations.

In an embodiment of the lighting device, the lighting device further comprises a user interface arranged for receiving a user input, the user input being representative of at least one of the group comprising:

selecting the first device from a plurality of first devices, and selecting a mode of operation of the lighting device, wherein the processor is further arranged for controlling the light output in accordance with the received user input. The user interface may for example comprise a touch-sensitive device such as a touchpad or a touchscreen, an audio sensor such as a microphone, a motion sensor such as an accelerometer, magnetometer and/or a gyroscope and/or one or more buttons for receiving the user input. The advantage of this embodiment is that it enables the user to select a first device, or to select a mode of operation (such as on/off, switch between a notification mode and an atmosphere creation mode, etc.).

According to a second aspect of the present invention the object is achieved by a lighting system for notification and/or atmosphere creation, the lighting system comprising:

a lighting device according to the lighting device of any one of the above-mentioned lighting devices, and a first device arranged for transmitting the first signal to the lighting device.

In an embodiment of the lighting system, the lighting system further comprises a proximity detector arranged for detecting a proximity between the first device and the lighting device, and the processor is further arranged for controlling the light output of the at least one light source in accordance with the light setting if the first device is within a predetermined detected proximity. In a further embodiment of the lighting system, the processor is further arranged for selecting the first device from a plurality of first devices based on the proximities of the plurality of first devices, wherein the processor is arranged to control the light output of the at least one light source based on the first signal provided by the selected first device. Determining the light output of the lighting device based on the proximity between the lighting device and the first device may be advantageous, because it may allow a user to bring the lighting device and the first device closer together in order to determine the functionality of the lighting device.

According to a third aspect of the present invention the object is achieved by a method of controlling a lighting device for notification and/or atmosphere creation, the method comprising:

detecting a first orientation of the lighting device, receiving a first signal from a first device, generating a first light setting based on the first signal and the first orientation of the lighting device, controlling the light output of the at least one light source of the lighting device based on the first light setting, detecting a user input indicative of a reorientation of the lighting device (100), detecting a second orientation based on the reorientation, generating a second light setting, based on the first signal and the second orientation of the lighting device (100), controlling the light output of the at least one light source (102) based on the second light setting, wherein the light output in the first orientation is different from the light output in the second orientation.

In embodiments of the method, the method may further comprise:

associating a plurality of light settings with a plurality of orientations of the lighting device, storing the associations, and controlling the light output of the at least one light source based on the light setting associated with a current orientation of the lighting device.

In an embodiment of the method, the first signal is indicative of an application running on the first device. In this embodiment, the application (e.g. a game application, an office application, a video application, etc.) running on the first device determines how the processor should generate the light settings for the orientations of the lighting device.

In an embodiment of the method, the first signal is indicative of a mode of operation of the first device. In this embodiment, the mode of operation (e.g. a thermostat set to a warm temperature, an alarm clock set to an alarm time, a lighting device set to a colourful light output, etc.) of the first device determines how the processor should generate the light settings for the orientations of the lighting device.

In an embodiment of the method, the first signal is indicative of a sensor output signal generated by the first device. In this embodiment, the sensor output signal (e.g. an occupancy sensor signal, a temperature sensor signal, an audio sensor signal, etc.) received from the first device determines how the processor should generate the light settings for the orientations of the lighting device.

In an embodiment of the method, the first signal is indicative of an output signal generated by an application running on the first device. In this embodiment, the output signal generated by the application (e.g. a change in stock value from a stock trading application, a light recipe from a video application, a song playing on an music application, etc.) received from the first device determines how the processor should generate the light settings for the orientations of the lighting device.

In an embodiment of the method, the first signal is indicative of an identifier of the first device. In this embodiment, the identifier of the first device (e.g. a television identification, an electronic fireplace identification, an e-reader identification, etc.) determines how the processor should generate the light settings for the orientations of the lighting device.

According to a fourth aspect of the present invention the object is achieved by a computer program product for a computing device, the computer program product comprising computer program code to perform any one of the above-mentioned methods when the computer program product is run on a processing unit of the computing device.

BRIEF DESCRIPTION OF THE DRAWINGS

The above, as well as additional objects, features and advantages of the disclosed lighting devices, lighting systems and methods, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
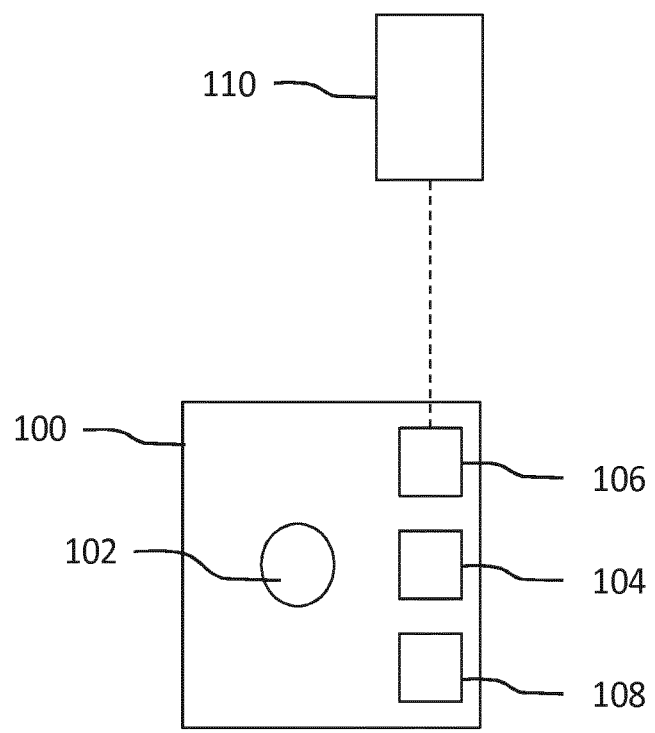
FIG. 1 shows schematically an embodiment of a lighting device according to the invention for notification and/or atmosphere creation by generating a light setting based on a first signal received from a first device.

FIG. 1 shows schematically an embodiment of a lighting device 100 according to the invention for notification and/or atmosphere creation. The lighting device 100 comprises at least one light source 102 arranged for rendering a light output. The lighting device 100 further comprises a detector 104 arranged for detecting a first orientation of the lighting device 100 and a receiver 106 for receiving a first signal from a first device 110. The lighting device 100 also comprises a processor 108 arranged for generating a first light setting based on the first signal and the first orientation of the lighting device 100, and for controlling the light output of the at least one light source 102 based on the first light setting, wherein the detector 104 is further arranged for detecting a user input indicative of a reorientation of the lighting device 100, and for detecting a second orientation based on the reorientation, and wherein the processor 108 is further arranged for generating a second light setting, based on the first signal and the second orientation of the lighting device 100, and for controlling the light output of the at least one light source 102 based on the second light setting, wherein the light output in the first orientation is different from the light output in the second orientation. The lighting device 100 may further comprise a power source (not shown) or an auxiliary power supply (not shown) for powering the components of the lighting device 100.

The lighting device 100 comprises the processor 108 arranged for rendering the light output of the at least one light source 102 based on the detected orientation and the received first signal. The at least one light source 102 of the lighting device 100 may be any type of light source 102 arranged for emitting light. The lighting device 100 may comprise an LED light source, an OLED light source, an incandescent light source, a fluorescent light source, etc. The lighting device 100 may be arranged for providing general lighting, task lighting, ambient lighting, atmosphere lighting, accent lighting, etc. The lighting device 100 may be installed in a luminaire or in a lighting fixture. Alternatively, the lighting device 100 may be a portable lighting device 100 (e.g. a hand-sized device, such as an LED cube, an LED sphere, an object/animal shaped lighting device 100, etc.) or a wearable lighting device 100 (e.g. a light bracelet, a light necklace, etc.).

Figure 2:
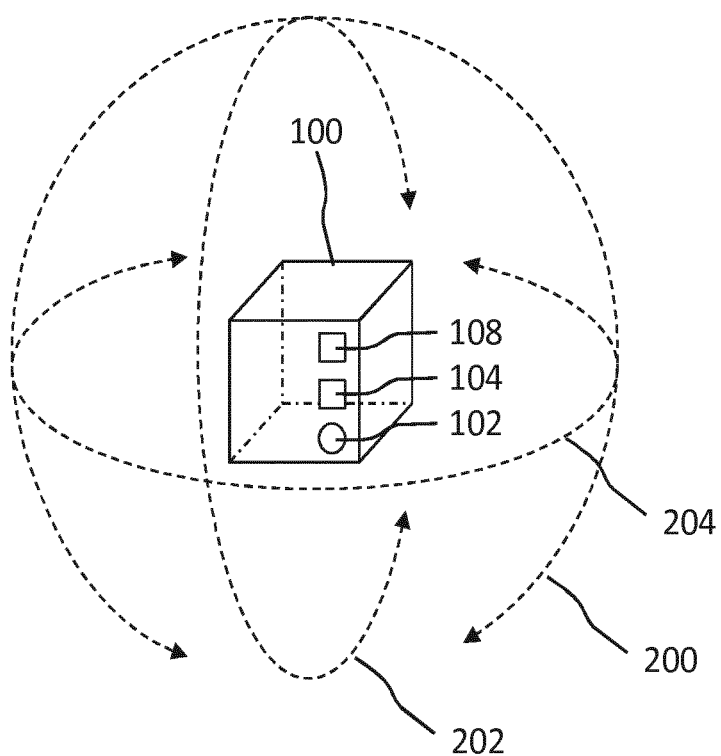
FIG. 2 shows schematically an embodiment of a lighting device according to the invention and how a detector may detect the orientation of the lighting device.
Figure 2:
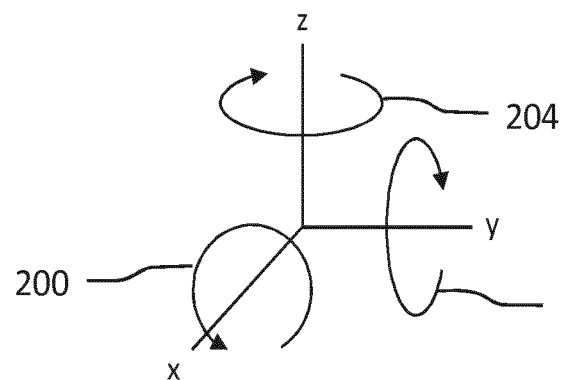

The detector 104 is arranged for detecting the orientation of the lighting device 100. The orientation refers to a characteristic regarding the orientation freedom (roll, pitch and yaw) in the 3D space. FIG. 2 shows schematically an embodiment of a lighting device 100 according to the invention and how the detector 104 may detect the orientation of the lighting device 100. The detector 104 may comprise one or more orientation sensors (such as one or more accelerometers, one or more gyroscopes, one or more magnetometers, one or more tilt sensors, one or more compasses, etc.) in order to determine the orientation of the lighting device 100. The orientation of the lighting device 100 may be defined by the roll 200, pitch 202 and yaw 204 of the lighting device 100 around the X, Y and Z axes. Upon detecting the orientation of the lighting device 100, the detector 104 may generate a signal in order to communicate the orientation to the processor 108. The processor 108 adjusts the light output of the at least one light source 102 of the lighting device 100 based on the detected orientation and the first signal. In a first example, the first signal may, for example, be received from a television, and upon detecting a 90 degree roll 200, the processor 108 may adjust the light output of the at least one light source 102 to a television atmosphere light setting, while upon detecting a 180 degree roll 200 and a 45 degree yaw 204, the processor 108 may determine to provide a visual indicator of the remaining duration of the television show by reducing the brightness of the lighting device 100 as a function of the remaining duration of the television show. In a second example, the first signal may, for example, be received from a game console running a racing game and upon detecting a 90 degree pitch 202, the processor 108 may adjust the light output of the at least one light source 102 to a gaming atmosphere light setting, while upon detecting a 180 degree roll 200, the processor 108 may determine to provide a visual indicator of the speed of race car by adjusting the brightness of the lighting device 100 as a function of the race car's speed.

The receiver 106 of the lighting device 100 is arranged for receiving the first signal from the first device. The signal may be any type of signal, message, data packet, etc. able to be transmitted via a communication protocol. The receiver 106 may receive the message(s), signal(s) or data packet(s) via any communication protocol (e.g. Wi-Fi, ZigBee, Bluetooth, DALI, DMX, USB, power over Ethernet, power-line communication, etc.). It may be beneficial if the lighting device 100 is arranged for communicating via a plurality of communication channels/protocols, thereby enabling the reception of messages, signals or data packets from a plurality of types of first devices 110.

The processor 108 may be further arranged for generating a plurality of light settings based on the received first signal, and for associating the plurality of light settings with a plurality of orientations of the lighting device 100. Additionally, the processor 108 may be arranged for determining a plurality of light settings based on a plurality of received first signals. The next examples clarify how the processor 108 may associate the plurality of light settings with the plurality of orientations.

In a first example, the first signal may be indicative of an application running on the first device, such as a social media application, a music application or an image-viewing application. In this example, each orientation is associated with a light setting related to the application running on the first device. In the example of a first signal indicative of a music application, the processor 108 may determine to associate for example a disco light setting with a first orientation, a pulse light setting pulsing on the beat of the music with a second orientation and a colour-changing light setting related to the music genre with a third orientation.

In a second example, the first signal may be indicative of a mode of operation of the first device, such as an HVAC system (heating, ventilation, and air conditioning control system) set to a winter mode, a computer set to sleep mode or an oven set to heating food mode. In this example, each orientation is associated with a light setting related to the mode of operation of the first device. In the example of a first signal indicative of an oven set to heating food mode, the processor 108 may determine to associate for example a temperature light setting (between red light and blue light) related to the temperature of the oven with a first orientation, a timer light setting (reducing the brightness of the light output) related to the remaining duration of the heating process with a second orientation and an energy light setting (between green and red light) related to the energy consumption of the oven with a third orientation.

In a third example, the first signal may be indicative of a sensor output signal generated by the first device, such as a light sensor signal, a humidity sensor signal or a solar sensor signal. In this example, each orientation is associated with a light setting related to the sensor output signal generated by the first device. In the example of a first signal indicative of a light sensor signal, the processor 108 may determine to associate for example a light setting compensating for a reduced amount of detected light with a first orientation, a light setting complementing the amount of detected light with a second orientation and a copy light setting copying the detected light with a third orientation.

In a fourth example, the first signal may be indicative of an output signal generated by an application running on the first device, such as a change in stock value from a stock trading application. In this example, each orientation is associated with a light setting related to the output signal generated by the application running on the first device. The processor 108 may determine to associate for example a first value of a first stock for a first light setting with a first orientation and a second value of a second stock for a second light setting with a second orientation.

In a fifth example, the first signal may be indicative of an identifier of the first device, such as a television, a laptop or a music system. In this example, each orientation is associated with a light setting related to the identifier of the first device, and not related to the specific mode of operation of the first device 110 or application running on the first device. In the example of a first signal indicative of a television, the processor 108 may determine to associate for example a warm light setting with a first orientation, a dimmed light setting with a second orientation and a lights-off setting with a third orientation.

It should be noted that the above-mentioned types of first signals are examples, and that a person skilled in the art will be able to design many alternative lighting devices 100 arranged for generating light settings based on other types of first signals without departing from the scope of the appended claims.

Figure 3:
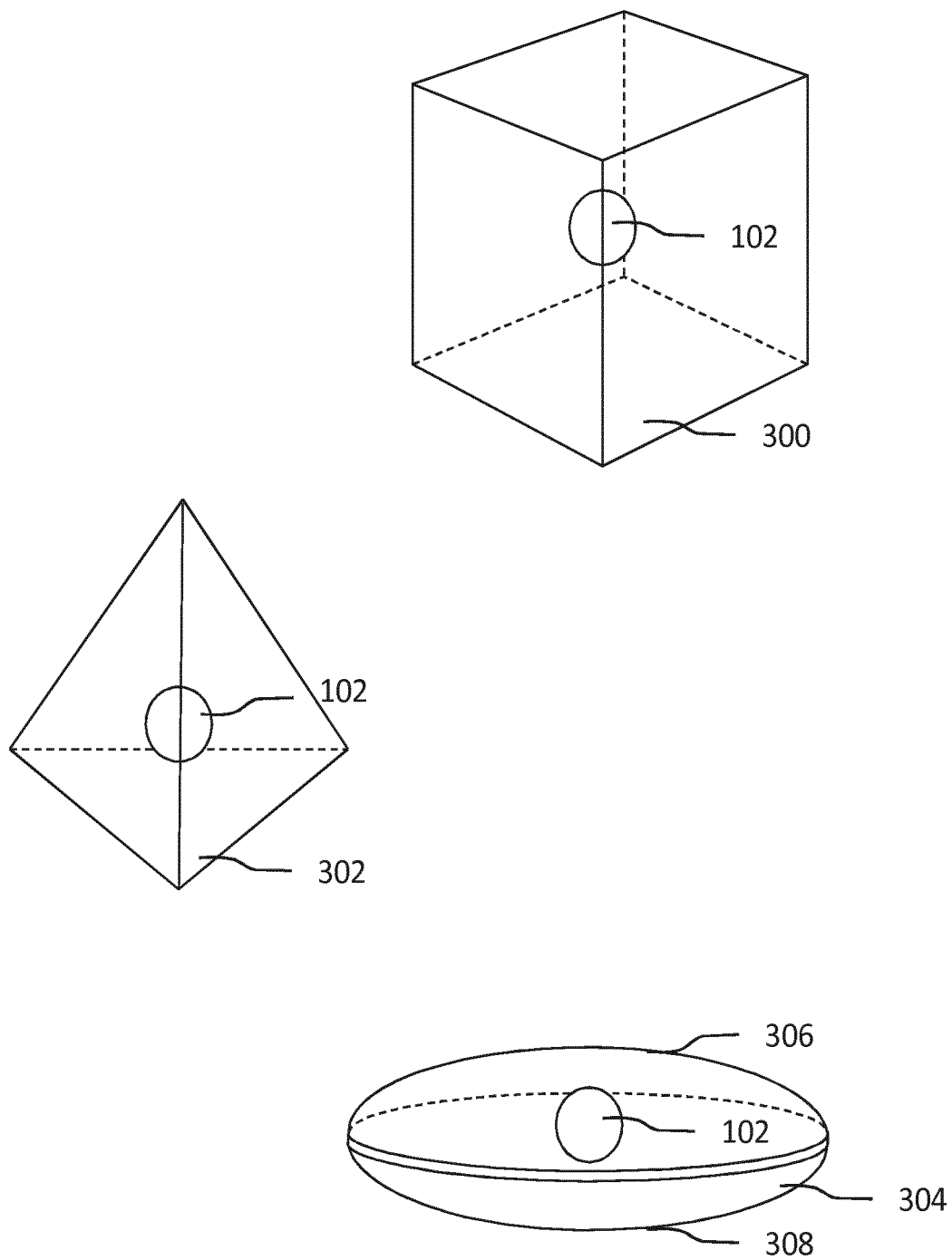
FIG. 3 shows schematically embodiments of lighting devices according to the invention, wherein the lighting devices comprise a plurality of surface areas corresponding to orientations of the lighting devices.

FIG. 3 shows schematically embodiments of lighting devices 300, 302, 304 according to the invention, wherein the lighting devices 300, 302, 304 comprise a plurality of surface areas corresponding to orientations of the lighting devices 300, 302, 304. In these embodiments, the processor (not shown) is arranged for associating a plurality of light settings with the plurality of surface areas, and the processor is arranged for controlling the light output of each surface area according to its associated light setting. The processor may determine to apply the light setting to only one surface area (e.g. only to the upward facing surface area) or to apply the plurality of light settings, each to its own surface area. The lighting device 300, 302, 304 may comprise a plurality of light sources 102, each one or more light source 102 arranged for rendering the light output of a surface area. The cube-shaped lighting device 300 illustrated in FIG. 3 comprises 6 surface areas with 6 orientations, each surface area corresponding to an orientation of the lighting device 300. The processor may associate 6 light settings, one light setting for each surface area. The pyramid-shaped lighting device 302 illustrated in FIG. 3 comprises 4 surface areas, each surface area corresponding to an orientation of the lighting device 302. The processor may associate 4 light settings with 4 orientations, one light setting for each surface area. The disc-shaped lighting device 304 illustrated in FIG. 3 comprises 2 surface areas 306, 308, each surface area corresponding to an orientation of the lighting device 304. The processor may associate 2 light settings with 2 orientations, one light setting for each surface area. It should be noted that the above-mentioned lighting devices 300, 302, 304 illustrate rather than limit the invention, and that those skilled in the art will be able to design many alternative lighting devices with a plurality of symmetrical, non-symmetrical, polygonal, curved, etc. surface areas.

The processor 108 may be arranged for generating a dynamic light setting based on the first signal and the current orientation of the lighting device 100. The dynamic light setting is a sequence of light settings distributed over a plurality of points in time. The dynamic light setting may for example be a rainbow colour effect (a change of colour of the light output of the lighting device 100 over time according to the colours of the rainbow). The dynamic light setting may be used for atmosphere creation (for example by gradually adjusting the light output of the lighting device 100) or for notification purposes (for example for a countdown light effect, a pulsing light effect, a gradual increase/decrease in brightness/colour, etc.).

In an embodiment, the lighting device 100 further comprises an audio rendering element arranged for generating an audio effect. The processor 108 is further arranged for controlling the audio rendering element based on the current orientation of the lighting device 100 and on the first signal, thereby generating the audio effect which is dependent on the current orientation and the first signal. The audio rendering element may for example be a speaker, a vibration motor, etc. The processor 108 may provide the audio effect in accordance with the light setting. The lighting device 100 may for example receive the first signal from a weather station, the first signal indicating that the sun is shining. The processor 108 may determine to associate a warm, dynamic light setting and a relaxing audio effect (e.g. the sound of waves) to a first orientation, and to associate a sky blue light setting and a natural audio effect (e.g. the chirping of birds) to a second orientation. In another example, lighting device 100 may receive the first signal from an alarm clock, the first signal indicating a wake-up time. The processor 108 may determine to associate a first wake-up light setting and a first audio effect (e.g. a weekday setting with a bright light setting and clear sounds) to a first orientation, and to associate a second wake-up light setting and a second audio effect (e.g. a weekend setting with a slow, gradual light increase and calm sounds) to a second orientation. Additionally, the processor 108 may be arranged for controlling the audio rendering element such that the audio effect comprises an embedded code. The embedded code (e.g. information packets embedded in the audio effect) may be comprised in the audible sound emitted by the audio rendering element. It may be desired that the coding is imperceptible for users that are interested in the auditory function of the lighting device 100, so the embedded code may be comprised in inaudible sound emitted by the audio rendering element. The embedded code may be detected by the first device 110, thereby providing to the first device 110 information about, for example, the selected light setting and/or the orientation of the lighting device 100.

In an embodiment, the processor 108 is further arranged for controlling the light output of the at least one light source 102 further based on time and/or date information. The lighting device 100 may for example be used as a sleep-light and awake-up light based on a first signal received from the alarm clock and the time of day. In the evening, the lighting device 100 may provide a plurality of sleep-light settings (e.g. a gradual shift from blue to red light setting, a dim setting, etc.) upon receiving a signal from the alarm clock, while the same lighting device 100 may function as a wake-up light, wherein the lighting device 100 may provide a plurality of wake-up light settings (e.g. a snooze light setting, an extended snooze light setting, a very bright light setting, etc.).

In an embodiment, the processor 108 is arranged for controlling the light output of the at least one light source 102 such that the light emitted by the at least one light source 102 comprises an embedded code. The embedded code (e.g. information packets embedded in the light emission) may be comprised in the visible light emitted by the at least one light source 102. It may be desired that the coding is imperceptible for users that are interested in the illumination function of the lighting device 100. The embedded code may be detected by the first device 110, thereby providing to the first device 110 information about, for example, the selected light setting and/or the orientation of the lighting device 100.

In an embodiment, the lighting device 100 further comprises a user interface arranged for receiving a user input. The user interface may for example comprise a touch-sensitive device such as a touchpad or a touchscreen, an audio sensor such as a microphone for detecting voice commands, a motion sensor such as an accelerometer and/or a gyroscope and/or one or more buttons for receiving the user input. The user input may be representative of selecting the first device 110 from a plurality of first devices 110 (e.g. via selecting a first device 110 on a touchscreen of the lighting device 100) or selecting a mode of operation of the lighting device 100 (e.g. switching between a notification mode and an atmosphere creation mode with a button). The user interface may be further arranged to enable to the user to define how the light settings are associated with the orientations, thereby providing the advantage that a user may determine the lighting device's behaviour.

The lighting device 100 may be further arranged for receiving user input signals from a further device. The further device, for example a smartphone, a smart watch, smart glasses, a laptop, etc., may be arranged for receiving the user input, wherein the user input is related to, for example, a selection of the first device 110 from a plurality of first devices 110, a selection of a mode of operation of the lighting device 100, an input related to associating light settings with orientations, etc.

The lighting device 100 may be further arranged for communicating with at least one further lighting device. The lighting device 100 may, for example, communicate the associations made between the orientations and the light settings in order to 'copy' the behaviour of the lighting device 100 to the further lighting device. This allows a user to orient the lighting devices differently, thereby enabling the user to for example perceive an atmosphere setting from a first lighting device and a notification setting from a second lighting device. Additionally or alternatively, the lighting device 100 may communicate its current light setting to the further lighting device, allowing the further lighting device to copy the current light setting of the first lighting device. This is beneficial because it allows a user to control the light output of a plurality of lighting devices by manipulating the orientation of the lighting device 100.

Figure 4:
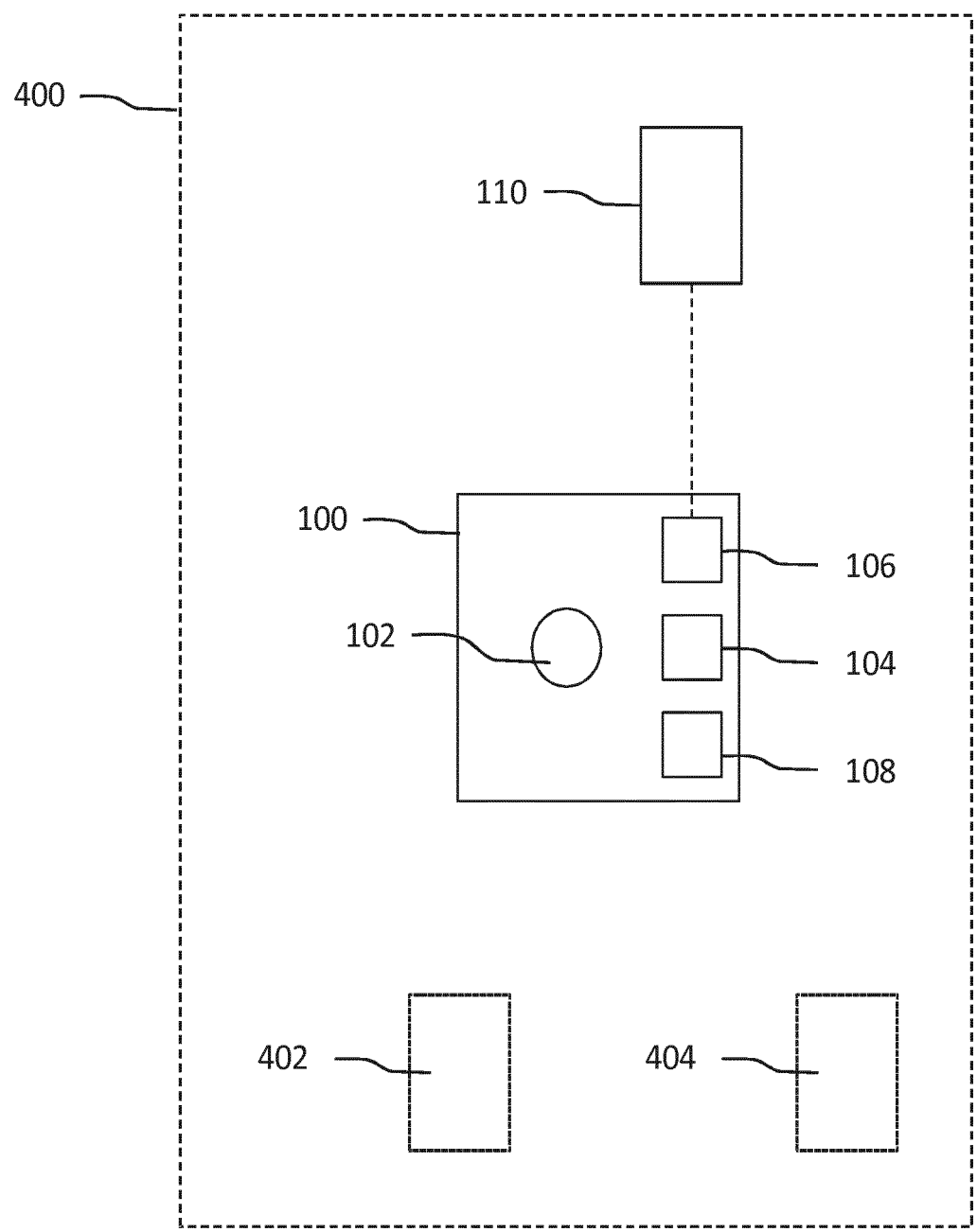
FIG. 4 shows schematically an embodiment of a lighting system according to the invention for notification and/or atmosphere creation, the lighting system further comprising a proximity detector and a memory.

FIG. 4 shows schematically an embodiment of a lighting system 400 according to the invention for notification and/or atmosphere creation. As illustrated in FIG. 4, the lighting system 400 may further comprise a memory 402 arranged for storing the orientations of the lighting device and the light settings associated therewith. The memory 402 may be comprised in the lighting device 100. Alternatively, the memory 402 may be comprised in a further device (not shown), such as a hub or a bridge connected to the lighting device 100 via a communication network.

Figure 5:
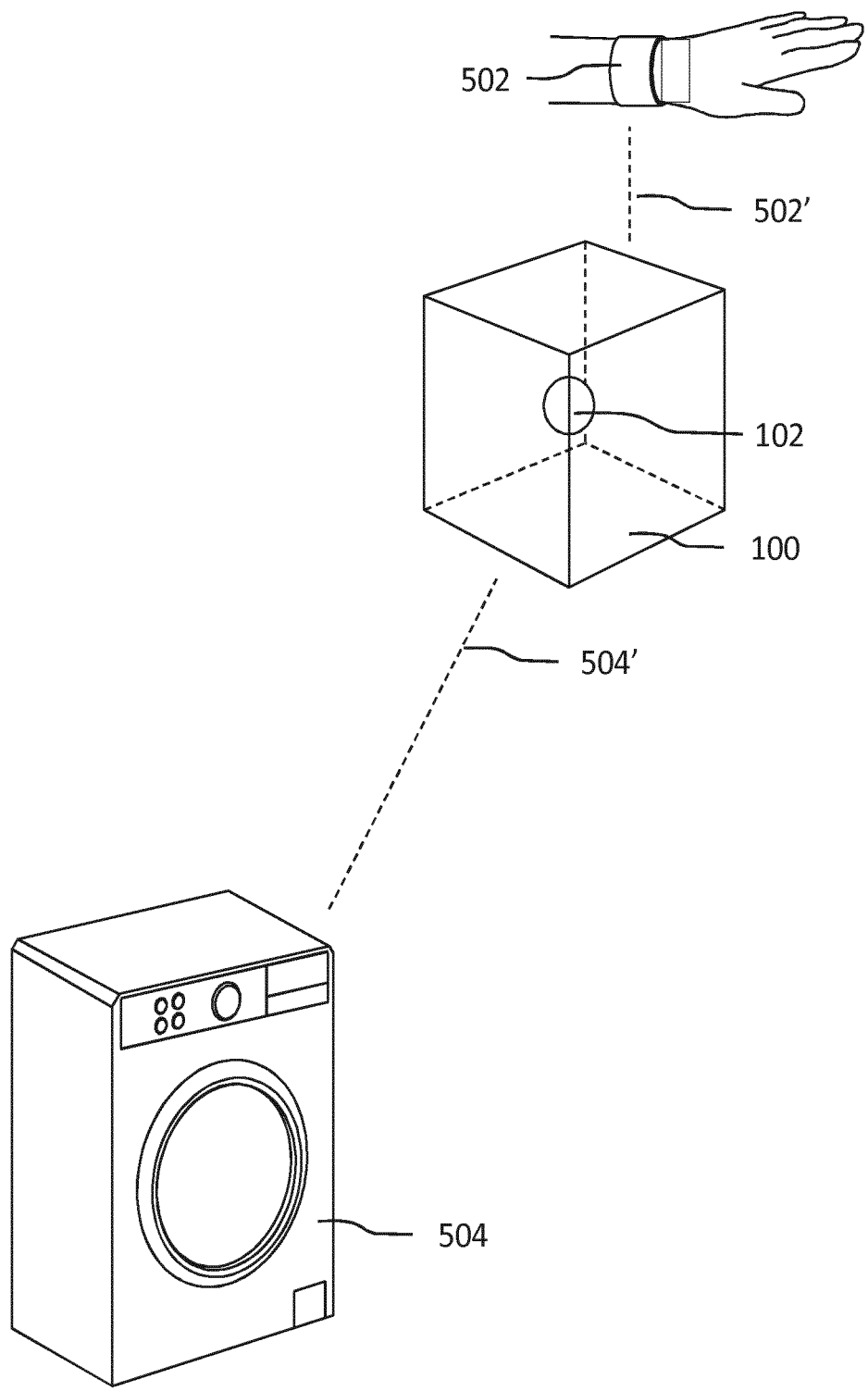
FIG. 5 shows schematically an embodiment of a lighting device according to the invention, wherein the light setting of the lighting device is based on the orientation of the lighting device, the first signal received from the first device and on the proximity of the first device.

As illustrated in FIG. 4, the lighting system 400 may further comprise a proximity detector 404 arranged for detecting a proximity between the first device 110 and the lighting device 100. In this embodiment, the processor 108 is further arranged for controlling the light output of the at least one light source 102 in accordance with the light setting if the first device 110 is within a predetermined detected proximity. Additionally or alternatively, the processor 108 may be further arranged for selecting the first device 110 from a plurality of first devices 110 based on the proximities of the plurality of first devices 110, wherein the lighting device 100 is arranged to control the light output of the at least one light source 102 based on the first signal provided by the selected first device 110. The proximity detector 404 may be comprised in the lighting device 100, in the first device 110 or in a further device. The proximity may be detected based on, for example, the received signal strength (RSS) of the first signal (RSS), near field communication (NFC) between the lighting device 100 and the first device 110, location data from an indoor positioning system or any other type of proximity detection system. An example of a lighting system 400 wherein the light setting is determined based on the proximity between the first device 110 and the lighting device 100 is illustrated in FIG. 5. In this example, the proximity detector 404 is comprised in a (home) positioning system (not shown) (e.g. an RF-beacon positioning system) that monitors the location of the devices connected to the positioning system. Based on the location data the positioning system may communicate to the lighting device 100 which first device 110 is in its closest proximity. In the example of FIG. 5, a wearable device 502 is in closer proximity (502'<504') to the lighting device 100 than a washing machine 504. Both the washing machine 504 and the wearable device 502 may transmit a first signal to the lighting device 100. The processor (not shown in FIG. 5) of the lighting device 100 may determine, based on the proximity 502', 504' to select the wearable device 502 and to control the light output based on the first signal received from the wearable device 502. The wearable device 502 may be, for example, a smart watch. The lighting device 100 may receive one or more first signals from the wearable device 502 and associate light settings with orientations. For example, the lighting device 100 may receive one or more signals related to the heartbeat of the person wearing the smart watch and one or more signals related to a social media notification provided to the user via the smart watch. The processor of the lighting device 100 may determine to associate the heartbeat of the user with a first orientation and a first light setting (e.g. a pulsing red light) and the social media notifications with a second orientation and a second light setting (e.g. an increase in brightness and saturation of the light for each notification). When the user moves the lighting device 100 closer towards the washing machine 504, the processor of the lighting device 100 may determine to associate the remaining duration of the washing program with a first orientation and a first light setting (e.g. a decrease in brightness based on the remaining duration) and to associate the power consumption or water consumption of the washing machine 504 with a second orientation and a second light setting (e.g. adjusting the brightness relative to the power consumption and adjusting the saturation of blue light relative to the water consumption).

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting device (100) for notification and/or atmosphere creation for a lighting system comprising a first device (110) arranged for transmitting a first signal to the lighting device (100) and a proximity detector arranged for detecting a proximity between the first device (110) and the lighting device (100), the lighting device (100) comprising:
   at least one light source (102) arranged for rendering a light output,
   a detector (104) arranged for detecting a first orientation of the lighting device (100),
   a receiver (106) arranged for receiving the first signal from the first device (110), and
   a processor (108) arranged for generating a first light setting based on the first signal and the first orientation of the lighting device (100), and for controlling the light output of the at least one light source (102) based on the first light setting if the first device (110) is within a predetermined proximity of the lighting device (100), wherein
   the detector (104) is further arranged for detecting a user input indicative of a reorientation of the lighting device (100), and for detecting a second orientation based on the reorientation, and wherein
   the processor (108) is further arranged for generating a second light setting, based on a second signal from a second device and the second orientation of the lighting device (100), and for controlling the light output of the at least one light source (102) based on the second light setting if the second device (110) is within the predetermined proximity of the lighting device (100), wherein the light output in the first orientation is different from the light output in the second orientation.

2. The lighting device of claim 1, wherein the processor is further arranged for generating a plurality of light settings based on the received first signal, and for associating the plurality of light settings with a plurality of orientations of the lighting device, and for controlling the light output of the at least one light source based on the light setting associated with a current orientation of the lighting device.

3. The lighting device of claim 2, wherein the processor is arranged for determining a plurality of light settings based on a plurality of received first signals, and for associating the plurality of light settings with a plurality of orientations of the lighting device.

4. The lighting device of claim 1, wherein the lighting device comprises a plurality of surface areas, wherein each surface area corresponds to an orientation of the lighting device, and wherein the processor is arranged for associating a plurality of light settings with the plurality of surface areas, and wherein the processor is arranged for controlling the light output of each surface area according to its associated light setting.

5. The lighting device of claim 1, wherein the processor is arranged for generating a dynamic light setting based on the first signal and a current orientation of the lighting device, the dynamic light setting being defined by a sequence of light settings distributed over a plurality of points in time.

6. The lighting device of claim 1, wherein the lighting device further comprises an audio rendering element arranged for generating an audio effect, and wherein the processor is further arranged for controlling the audio rendering element based on a current orientation of the lighting device and the first signal, thereby generating the audio effect which is dependent on the current orientation and the first signal.

7. The lighting device of claim 1, wherein the processor (108) is further arranged for controlling the light output of the at least one light source (102) further based on time and/or date information.

8. The lighting device of claim 1, wherein the processor is arranged for controlling the light output of the at least one light source (102) such that the light emitted by the at least one light source comprises an embedded code.

9. The lighting device of claim 1, wherein the lighting device further comprises a user interface arranged for receiving a user input, the user input being representative of at least one of the group comprising:
- selecting the first device from a plurality of first devices, and
- selecting a mode of operation of the lighting device, wherein the processor is further arranged for controlling the light source in accordance with the received user input.

10. A lighting system for notification and/or atmosphere creation, the lighting system comprising:
- a lighting device according to the lighting device of claim 1, and
- a first device arranged for transmitting the first signal to the lighting device.

11. The lighting device of claim 1, wherein the lighting device comprises the proximity detector.

12. A method of controlling a lighting device for notification and/or atmosphere creation, the method comprising:
- detecting a first orientation of the lighting device,
- receiving a first signal from a first device,
- detecting a proximity between a first device and the lighting device,
- generating a first light setting based on the first signal and the first orientation of the lighting device,
- controlling the light output of the at least one light source of the lighting device based on the first light setting if the first device is within a predetermined proximity of the lighting device,
- detecting a user input indicative of a reorientation of the lighting device,
- detecting a second orientation based on the reorientation,
- generating a second light setting, based on a second signal from a second device and the second orientation of the lighting device,
- controlling the light output of the at least one light source based on the second light setting if the second device is within the predetermined proximity of the lighting device, wherein the light output in the first orientation is different from the light output in the second orientation.

13. The method of claim 12, further comprising:
- associating a plurality of light settings with a plurality of orientations of the lighting device,
- storing the associations, and
- controlling the light output of the at least one light source based on the light setting associated with a current orientation of the lighting device.

14. The method of claim 12, wherein the first signal is indicative of at least one of the group comprising:
- an application running on the first device,
- a mode of operation of the first device,
- a sensor output signal generated by the first device,
- an output signal generated by an application running on the first device, and
- an identifier of the first device.

15. A computer program product for a computing device, the computer program product comprising computer program code to perform the method of claim 12 when the computer program product is run on a processing unit of the computing device.

* * * * *